(12) United States Patent
Chen et al.

(10) Patent No.: US 8,010,768 B2
(45) Date of Patent: Aug. 30, 2011

(54) SECURE AND SCALABLE SOLID STATE DISK SYSTEM

(75) Inventors: Ben Wei Chen, Fremont, CA (US);
Yungteh Chien, Lake Forest, CA (US);
Choon Tak Tang, Irvine, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 902 days.

(21) Appl. No.: 11/746,576

(22) Filed: May 9, 2007

(65) Prior Publication Data

US 2008/0282264 A1 Nov. 13, 2008

(51) Int. Cl.
*G06F 12/00* (2006.01)
(52) U.S. Cl. ........................................ 711/170
(58) Field of Classification Search .................. None
See application file for complete search history.

(56) References Cited

U.S. PATENT DOCUMENTS

| | | |
|---|---|---|
| 5,012,514 A | 4/1991 | Renton |
| 5,394,532 A | 2/1995 | Belsan |
| 5,442,704 A | 8/1995 | Holtey |
| 5,469,564 A | 11/1995 | Junya |
| 5,768,373 A | 6/1998 | Lohstroh et al. |
| 5,937,066 A | 8/1999 | Gennaro et al. |
| 5,999,711 A | 12/1999 | Misra et al. |
| 6,098,119 A | 8/2000 | Surugucchi et al. |
| 6,134,630 A | 10/2000 | McDonald et al. |
| 6,138,176 A | 10/2000 | McDonald et al. |
| 6,148,387 A | 11/2000 | Galasso et al. |
| 6,226,732 B1 | 5/2001 | Pei et al. |
| 6,311,269 B2 | 10/2001 | Luckenbaugh et al. |
| 6,324,537 B1 | 11/2001 | Moran |
| 6,408,074 B1 | 6/2002 | Loughran |
| 6,421,760 B1 | 7/2002 | McDonald et al. |
| 6,530,078 B1 | 3/2003 | Shmid et al. |
| 6,549,981 B2 | 4/2003 | McDonald et al. |
| 6,567,889 B1 | 5/2003 | DeKoning et al. |
| 6,751,318 B2 | 6/2004 | Crandall |
| 6,868,160 B1 | 3/2005 | Raji |
| 6,877,044 B2 | 4/2005 | Lo et al. |
| 6,880,054 B2 | 4/2005 | Cheng et al. |
| 6,883,083 B1 | 4/2005 | Kemkar |
| 7,003,623 B2 | 2/2006 | Teng |
| 7,039,759 B2 | 5/2006 | Cheng et al. |
| 7,043,684 B2 | 5/2006 | Joly |
| 7,047,416 B2 | 5/2006 | Wheeler et al. |
| 7,073,010 B2 | 7/2006 | Chen et al. |
| 7,089,585 B1 | 8/2006 | Dharmarajan |
| 7,096,354 B2 | 8/2006 | Wheeler et al. |
| 7,110,982 B2 | 9/2006 | Feldman et al. |
| 7,124,203 B2 | 10/2006 | Joshi et al. |

(Continued)

FOREIGN PATENT DOCUMENTS

WO 0161692 A1 8/2001

(Continued)

*Primary Examiner* — Hiep T Nguyen
(74) *Attorney, Agent, or Firm* — Sawyer Law Group, P.C.

(57) ABSTRACT

A solid state disk system is disclosed. The system comprises a user token and at least one level secure virtual storage controller, coupled to the host system. The system includes a plurality of virtual storage devices coupled to at least one secure virtual storage controller. A system and method in accordance with the present invention could be utilized in flash based storage, disk storage systems, portable storage devices, corporate storage systems, PCs, servers, wireless storage, and multimedia storage systems.

8 Claims, 16 Drawing Sheets

U.S. PATENT DOCUMENTS

| | | |
|---|---|---|
| 7,127,606 B2 | 10/2006 | Wheeler et al. |
| 7,133,845 B1 | 11/2006 | Ginter et al. |
| 7,200,747 B2 | 4/2007 | Riedel et al. |
| 7,269,004 B1 | 9/2007 | Ni et al. |
| 7,344,072 B2 | 3/2008 | Gonzalez et al. |
| 7,406,617 B1 | 7/2008 | Athreya et al. |
| 7,438,234 B2 | 10/2008 | Bonalle et al. |
| 7,454,531 B2 | 11/2008 | Shih |
| 7,506,819 B2 | 3/2009 | Beenau et al. |
| 7,591,018 B1 | 9/2009 | Lee |
| 7,664,903 B2 | 2/2010 | Belonoznik |
| 7,774,525 B2 * | 8/2010 | Farhan et al. ............ 710/74 |
| 2002/0080958 A1 | 6/2002 | Ober et al. |
| 2002/0103943 A1 | 8/2002 | Lo et al. |
| 2003/0014653 A1 | 1/2003 | Moller et al. |
| 2003/0018862 A1 | 1/2003 | Karnstedt et al. |
| 2003/0110351 A1 | 6/2003 | Blood et al. |
| 2003/0120865 A1 | 6/2003 | McDonald et al. |
| 2004/0093495 A1 | 5/2004 | Engel |
| 2004/0103288 A1 | 5/2004 | Ziv et al. |
| 2004/0123127 A1 | 6/2004 | Teicher et al. |
| 2004/0128468 A1 | 7/2004 | Lloyd-Jones |
| 2005/0005044 A1 | 1/2005 | Liu et al. |
| 2005/0005063 A1 | 1/2005 | Liu et al. |
| 2005/0005131 A1 | 1/2005 | Yoshida et al. |
| 2005/0033956 A1 | 2/2005 | Krempl |
| 2005/0097348 A1 | 5/2005 | Jakubowski et al. |
| 2005/0109841 A1 | 5/2005 | Ryan et al. |
| 2005/0193162 A1 | 9/2005 | Chou et al. |
| 2005/0195975 A1 | 9/2005 | Kawakita |
| 2005/0250473 A1 | 11/2005 | Brown et al. |
| 2005/0281088 A1 | 12/2005 | Ishidoshiro et al. |
| 2006/0047794 A1 | 3/2006 | Jezierski |
| 2006/0072743 A1 | 4/2006 | Naslund et al. |
| 2006/0075485 A1 | 4/2006 | Funahashi et al. |
| 2006/0104441 A1 | 5/2006 | Johansson et al. |
| 2006/0131431 A1 | 6/2006 | Finn |
| 2006/0208066 A1 | 9/2006 | Finn et al. |
| 2006/0219776 A1 | 10/2006 | Finn |
| 2007/0214369 A1 | 9/2007 | Roberts et al. |
| 2008/0059730 A1 | 3/2008 | Cepulis |
| 2008/0109607 A1 | 5/2008 | Astigarraga et al. |
| 2008/0155276 A1 | 6/2008 | Chen |
| 2008/0279382 A1 | 11/2008 | Chen et al. |
| 2008/0282027 A1 | 11/2008 | Chen et al. |

FOREIGN PATENT DOCUMENTS

| | | |
|---|---|---|
| WO | 2008140868 | 11/2008 |
| WO | 2009110878 | 9/2009 |

* cited by examiner

SECURE AND SCALABLE SOLID STATE DISK SYSTEM

CROSS-REFERENCE TO RELATED APPLICATIONS

This application is a co-pending application of the U.S. patent applications Ser. Nos. 11/746,556 and 11/746,582, both of which are entitled "Secure And Scalable Solid State Disk System" and are filed on even-date herewith. All of which is incorporated herein by reference.

FIELD OF THE INVENTION

The present invention relates generally to memory systems and more specifically to a secure and scalable solid state disk system.

BACKGROUND OF THE INVENTION

Flash based solid state disk (SSD) has slowly gained momentum and acceptance from industrial application, defense application, corporate application to server application and general user application. The major driving force behind the transition is due to advances in flash technology development and the intrinsic benefits from the flash components. The advantages of flash based SSD over tradition hard disk drive (HDD) are:
 1. Lower power consumption.
 2. Lighter weight.
 3. Lower heat dissipation.
 4. No noise.
 5. No mechanical parts.

But SSD has its disadvantages that have been the hurdles for replacing HDD:
 1. Higher cost.
 2. Lower density.
 3. Lower performance.

Further, a conventional SSD tends to manage a group of flash memory, in the order of 4, 8, 16, 32 or more components. It presents a great design challenge in the areas:
 1. Pin-outs to manage too many flash device interfaces.
 2. Wear-leveling across too many flash components.
 3. Manufacturability and testability on SSD system.
 4. Time lag in supporting and taking advantage of new flash technology.
 5. Time to market.
 6. Cost saving from new flash technology.

Traditional HDD comes without security built-in. If a host system with a HDD is stolen, the content of the HDD can easily be accessed and misappropriated. Even though there is a software solution to provide the whole disk encryption, it suffers several problems in real life application:
 1. Performance penalty due to software encryption and decryption.
 2. Additional driver installation required.
 3. Still leaving room for attack if the password authentication utility is resided in the HDD.

If SSD is to become mainstreamed to transition from a niche product to a more general user application, it has to address the hurdles mentioned above, in addition to adding values such as security, scalability and others.

A conventional Secure Digital (SD) flash card block diagram is shown in FIG. 1. The block diagram comprises a physical interface 11, a SD card controller 12 and flash memory 13. The physical interface 11 connects to a host system through interface bus 14. A SD card, Compact Flash (CF) card and USB drive are the simplest form of a solid state disk (SSD).

In a conventional storage system, such as the ones described in U.S. patent Ser. No. 10/707,871 (20050005044), U.S. Ser. No. 10/709,718 (20050005063), U.S. Pat. Nos. 6,098,119, and 6,883,083, 6,877,044, 6,421,760, 6,138,176, 6,134,630, 6,549,981 and published application no. US 20030120865 a storage controller automatically configures disk drives at system boot-up or at runtime. It performs the basic storage identification and aggregation functionality. The prior art invention is best at detecting the drive insertion and removal during runtime. But it fails to recognize the asynchronous nature between the host system and the storage system during boot-up time. Since the storage controller functions as a virtualization controller, it takes time to identify, test and to configure the physical drives during host system boot-up. If there is not a mechanism to re-synchronize the host system and the storage system, the host system will simply time-out and fail to recognize and configure the virtual logical storage. As such, the conventional systems at best serve only as a secondary storage system, instead of a primary storage system. Another weakness of U.S. Pat. No. 6,098,119 is that the system requires each physical drive to have one or more preloaded "parameter settings" during initialization. It poses the limitation in auto-configuration.

Most of the conventional systems do not address the storage expandability and scalability either. Even though U.S. patent application Ser. No. 10/707,871 (20050005044) and U.S. patent application Ser. No. 10/709,718 (20050005063) do address the storage virtualization computer system with scalability, its focus is on the "external" storage virtualization controller coupling to a host entity that can be a host computer or a server. It fails to address the virtual storage boot-up problem mentioned above. It is still at best serving as a secondary storage based on its storage virtualization architecture.

Further, conventional systems fail to address the drive security in password authentication and hardware encryption that is vital in notebook computer primary drive application.

As in U.S. Pat. No. 7,003,623 as shown in FIG. 2, a more straight forward SSD system comprises a SATA (Serial ATA) to flash memory controller 25 and a group of flash memory 13. The SATA to flash memory controller 25 includes a SATA host interface 251, and a plurality of flash device interfaces 252. SATA host interface is for interfacing with the SATA host controller 21 of Host system 20, while the flash device interfaces 252 are for interfacing with the flash memory 13.

Each flash memory 13 has a total of about 15 to 23 signal pins to interface with the controller 25. The SATA host interface 251 requires 4 signal pins to interface with the SATA host controller 21. The SATA to flash memory controller 25 would require a total of at least 124 signal pins to manage 8 flash memory 13; or a total of 244 signal pins to manage 16 flash memory 13.

As is seen in FIG. 2, the controller 25 has to manage the error correction code (ECC), wear leveling, bad block re-mapping, free storage allocation, as well as many book keeping tasks inherent to flash memory based SSD. As it can be seen, the complexity increases proportionally to the number of flash memory components. It not only presents cost issue to the controller, but also creates manufacturability and testability on the conventional SSD system. In essence, this conventional approach is not very scalable, if the same controller is to be used for two or more different density designs. The pin count of the controller will have to accommodate at least 124 pins for four flash memory, or 244 pins for eight flash memory, or even 484 pins for sixteen flash memory chips. Therefore, this system is limited only on a small density application of SSD that is not very scalable and expandable.

Accordingly, what is desired is a system and method that addresses the above-identified issues. The present invention addresses such a need.

SUMMARY OF THE INVENTION

A solid state disk system is disclosed. The system comprises a user token and a first level secure virtual storage controller, coupled to the host system. The system also includes a plurality of second level secure virtual storage controllers having an interface with and being compatible to the first level secure virtual storage controller and a plurality of third level secure virtual storage devices coupled to the plurality of second level secure virtual storage controllers.

A system and method in accordance with the present invention provides the following advantages.

1. The system and method introduces a secure virtual storage controller architecture.
2. The system and method introduces a scalable SSD system, based on the secure virtual storage controller architecture.
3. The system and method bases the building blocks on the most prevalent and popular flash card/drive to tap into the latest flash component technology in cost, density and performance.
4. The system and method uses the virtual storage processor to aggregate the density and performance.
5. The system and method uses more layers of virtual storage controller, if necessary, to expand the density and performance.
6. The system and method uses the crypto-engine in the virtual storage controller, if necessary, to conduct encryption/decryption on-the-fly between the upstream and downstream data traffic between the host and device.
7. The system and method utilizes a USB token for independent password authentication on SSD.
8. The system and method allows secure-and-scalable solid state disk (SNS-SSD) to replace HDD with transparent user experience, from booting up, hibernation to general usage.

A system and method in accordance with the present invention could be utilized in flash based storage, disk storage systems, portable storage devices, corporate storage systems, PCs, servers, wireless storage, and multimedia storage systems.

DETAILED DESCRIPTION

The present invention relates generally to memory systems and more specifically to a secure and scalable solid state disk system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
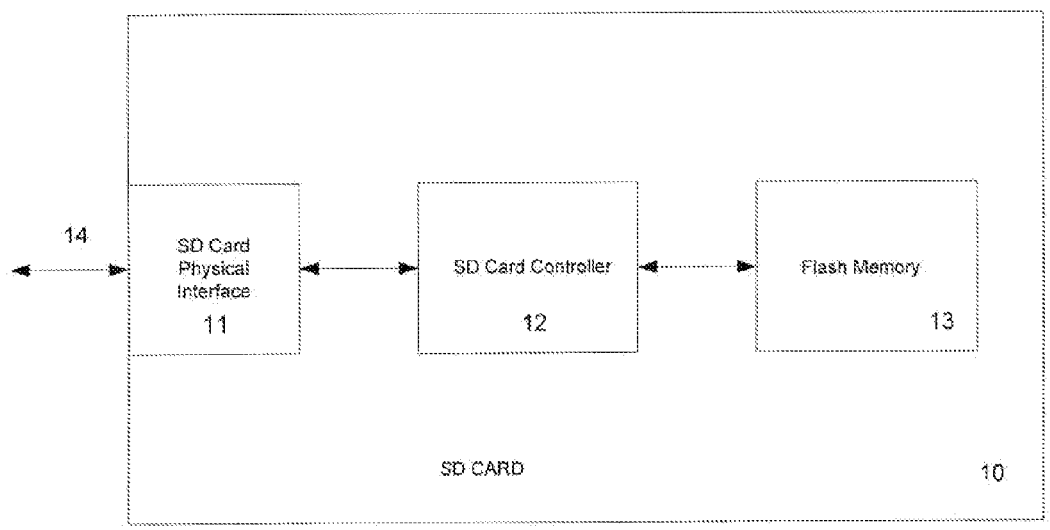
FIG. 1 is a prior art block diagram of a SD Card.
Figure 2:
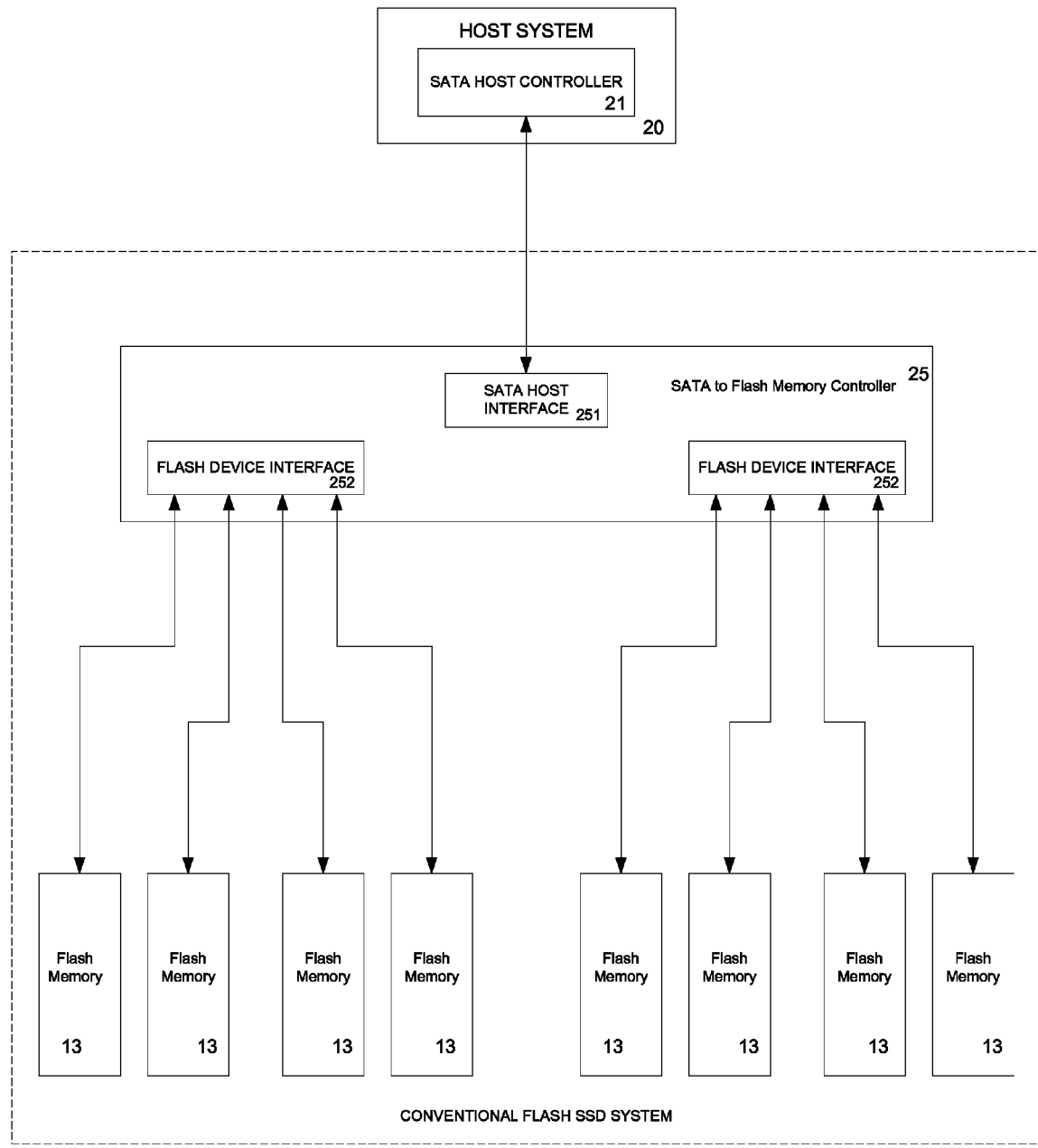
FIG. 2 is a prior art block diagram of a host system interfacing with a conventional SSD system.
Figure 3:
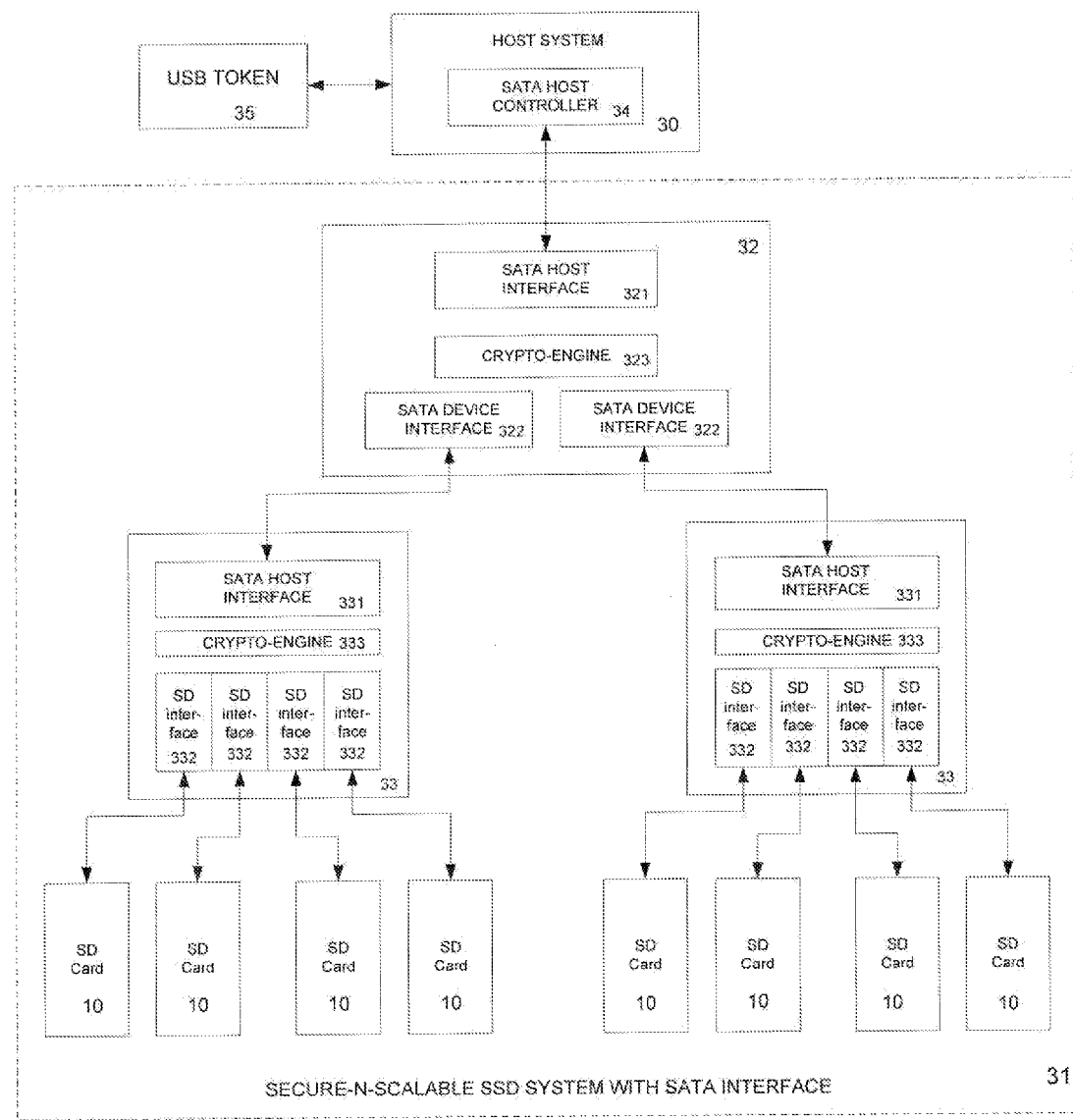
FIG. 3 is a block diagram of a host system and a USB token interfacing with a SATA based secure-and-scalable solid state disk (SNS-SSD) system based on a three-level architecture.

FIG. 3 is a block diagram of a host system and a USB token interfacing with a SATA based secure-and-scalable solid state disk (SNS-SSD) system. The host system 30, comprises a processor (not shown), memory (not shown), IO (not shown), a USB interface (not shown), and a SATA host controller 34. It connects to a USB token 35 through a USB interface and works with the secure-and-scalable solid state disk (SNS-SSD) system 31 through a SATA host interface 321.

A USB token 35 serves as an independent agent to provide password authentication utility before the SNS-SSD 31 can be accessed after host system 30 boots up. The utility can be a software utility residing on the USB token 35 or preferably a browser link to the web server on the USB token 35. The browser link is preferable, as it is more universal and requires less system resources to work on cross platform devices.

The secure-and-scalable solid state disk (SNS-SSD) system 31 comprises a first-level secure virtual storage controller 32 and two second-level secure virtual storage controllers 33, and eight third-level storage device SD cards 10.

The first level of the secure virtual storage controller 32 comprises a SATA host interface 321, a crypto-engine 323 and a multiple of SATA device interfaces 322. The host side storage interface in this case is a serial ATA or SATA. The storage host interface can be any type of IO interface including SATA, Serial Attached SCSI (SAS), PCI Express, PATA, USB, Bluetooth, UWB or wireless interface. A more detailed description of the virtual storage controller 32 is shown in secure virtual storage controller 40 in FIG. 4.

The second-level of the virtual storage controller 33 comprises a SATA host interface 331, a crypto-engine 333 and a multiple of SD device interfaces 332. Instead of interfacing directly with the flash memory, the virtual storage controller 33 chooses to interface with the third level storage device, a SD card 10. The SD card 10 can be replaced with any flash based card or drive, including CF card, MMC, USB drive or Memory Stick, as long as pin-count, cost, and performance justify. In this case, each SD card 10 has six signal pins. It requires a total of 24 signal pins for four SD components with two flash memory components on each SD card, instead of 120 signal pins for eight flash memory components in the conventional approach. It amounts to a great cost saving in controller chip fabrication and a better manufacturability and testability.

Even though the first-level secure virtual storage controller 32 and the second-level secure virtual storage controller 33 may have different type of device interfaces, their architectures are substantially identical. As long as the storage device interface 322 is compatible with the storage host interface 331, first-level secure virtual storage controller 32 can be cascaded and expanded with the second-level secure virtual storage controller 33. The expansion is therefore exponential in density and performance. In its simplest form of architecture of secure-and-scalable solid state disk (SNS-SSD) system, the host system 30 can interface directly with one of the second level virtual storage controllers 33. The minimal secure-and-scalable solid state disk (SNS-SSD) system is therefore with a total two levels comprising the second level storage controller 33 and the third level storage devices 10.

Figure 13:
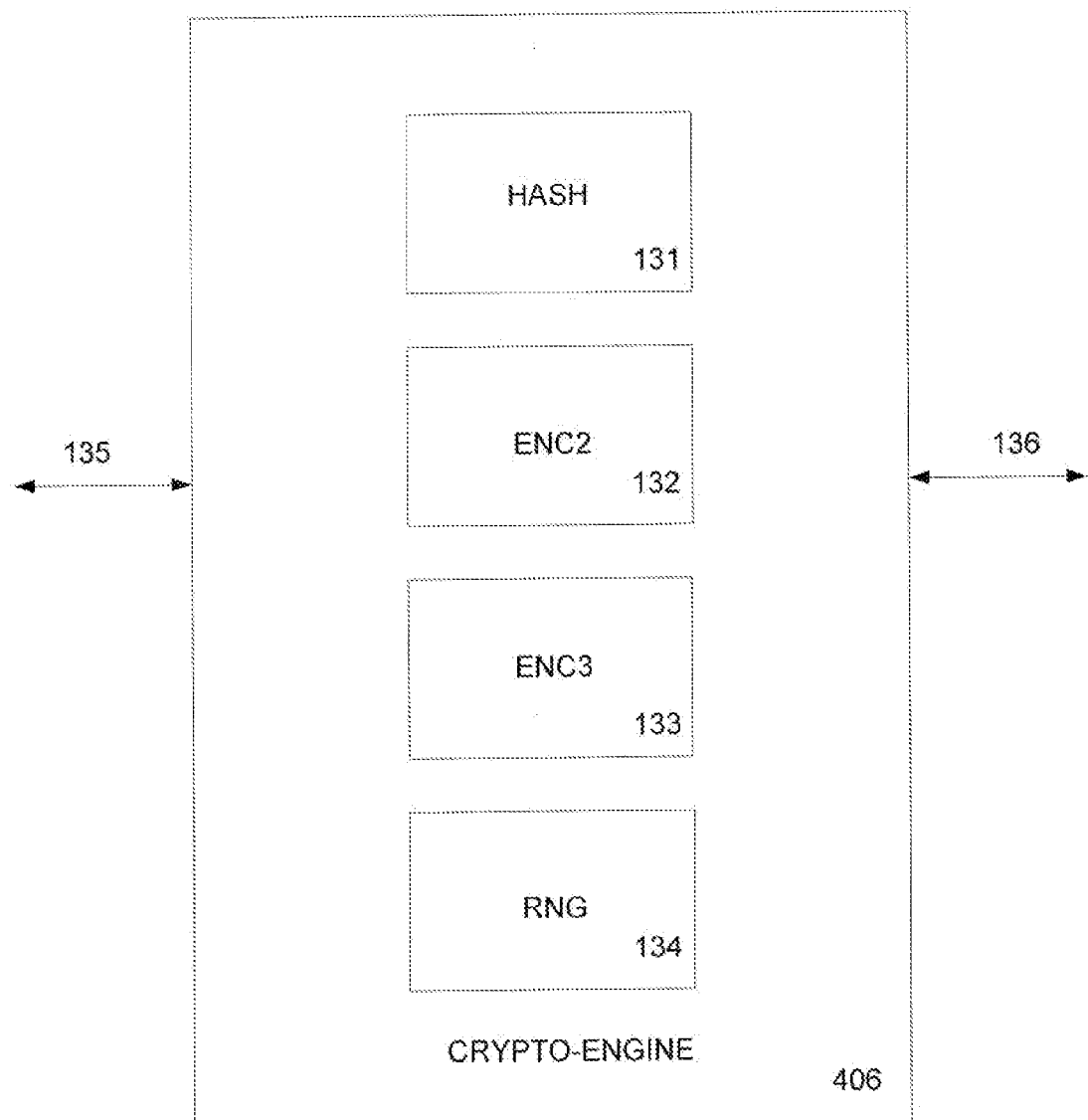
FIG. 13 is a block diagram for the crypto-engine.

The crypto-engine 323 in the first-level and crypto-engine 333 in the second-level can be enabled, disabled and configured independently, depending on the requirement. In most cases, only the top-level crypto-engine is required. All other crypto-engines in the subsequent levels are disabled. A more detailed description of the crypto-engine is shown in FIG. 13.

On the host storage interface, a SATA host interface 331 is used to interface with the first level of virtual storage controller 32. The storage interface in this case is a serial ATA or SATA. A more detailed description of the virtual storage controller 33 is shown in secure virtual storage controller 40 in FIG. 4.

Figure 4:
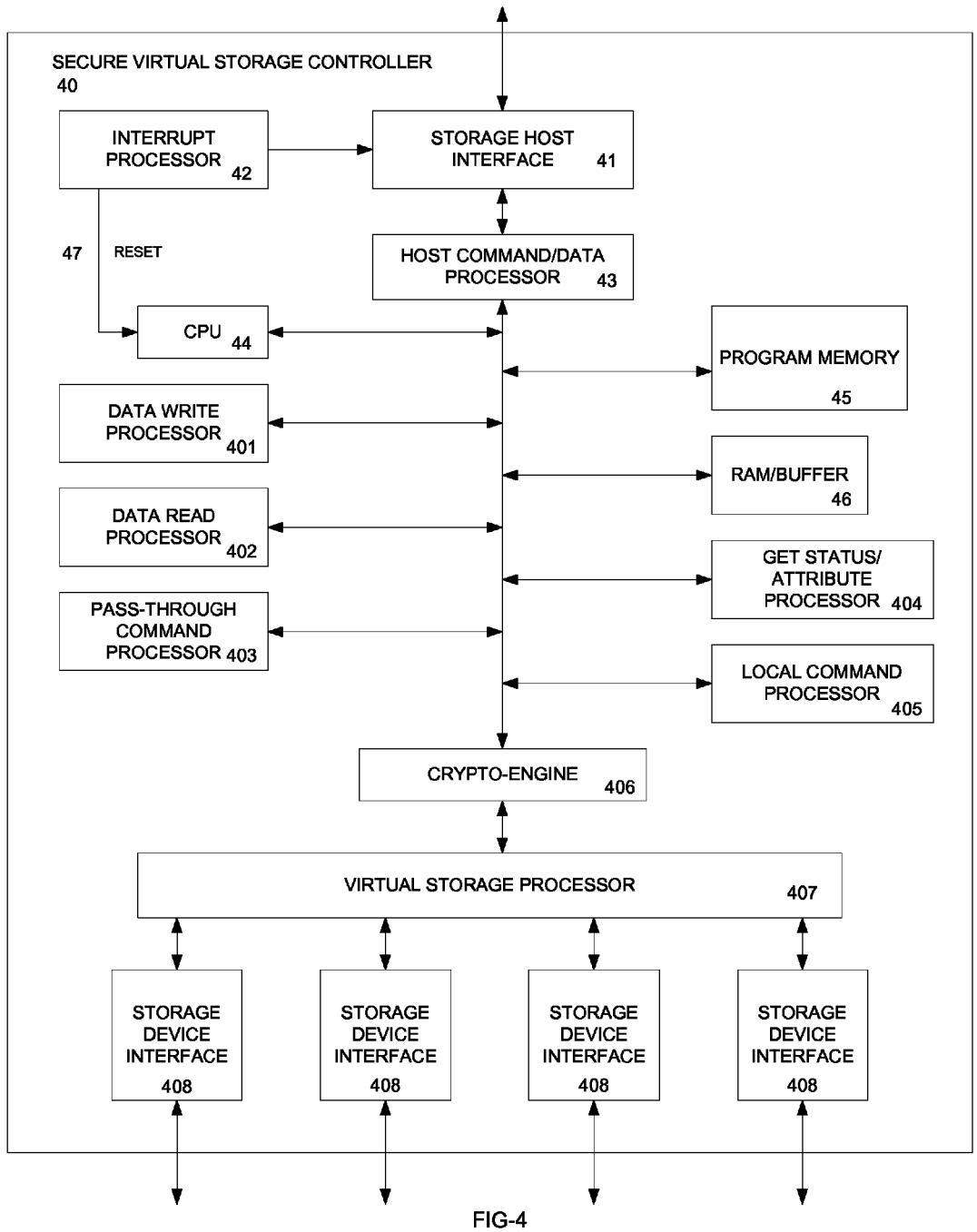
FIG. 4 is the block diagram of the secure virtual storage controller.

As shown in FIG. 4, the secure virtual storage controller 40 comprises a storage host interface 41, an interrupt processor 42, a host command and data processor 43, a CPU 44, a program memory 45, a RAM and buffer 46, a DATA write processor 401, a DATA read processor 402, a pass-through command processor 403, a get status and attribute processor 404, a local command processor 405, a crypto-engine 406, a virtual storage processor 407, and a plurality of storage device interfaces 408.

The virtual storage controller architecture in the invention is cascadable and scalable as long as the storage interface is compatible. If more density is required, more second level virtual storage controllers can be added for expansion. Accordingly, more third level storage devices can be added for density expansion. Compared with the conventional approach, the secure-and-scalable solid state disk (SNS-SSD) system offers better storage density expansion in exponential order. By using the standard flash card such as SD card 10 as the flash memory building block, it brings along several benefits compared with the conventional SSD approach.

By using the standard flash card such as SD card 10 as the flash memory building block, it brings along several benefits compared with the conventional SSD approach:

1. Wear-leveling of flash memory is delegated locally to the SD card 10. No grand scale wear-leveling across all flash components is required.

2. Manufacturability and testability are done at the storage device level on SD card. It is more manageable at the device level than at SSD system level.

3. There is no time lag in supporting and taking advantage of new flash technology, as the design and development is delegated to the standard SD controller 12 inside SD card 10.

4. Time to market is much shorter. As soon as the SD card 10 is available in cost, density and performance, the secure-and-scalable solid state disk (SNS-SSD) system 31 can be deployed.

5. Cost saving from new flash technology again is brought along by the building block architecture of SD card 10.

6. The performance benefit is from the virtual storage processor 32 and 33. It not only provides virtual storage density aggregation, but also provides on-demand performance aggregation. The theoretical performance can be as high as the number of SD cards times the native SD card performance in parallel operation.

7. The security is handled by the hardware based crypto-engine 323 or 333. The password authentication utility resides independently on a USB token 35. The secure-and-scalable solid state disk (SNS-SSD) system has better performance and is more secure.

The storage host interface 41 is for interfacing with the upstream host system 30 or another upper-level of secure virtual storage controller. The storage device interface 408 is for interfacing with the downstream storage device 10 or another lower-level of secure virtual storage controller.

Figure 5:
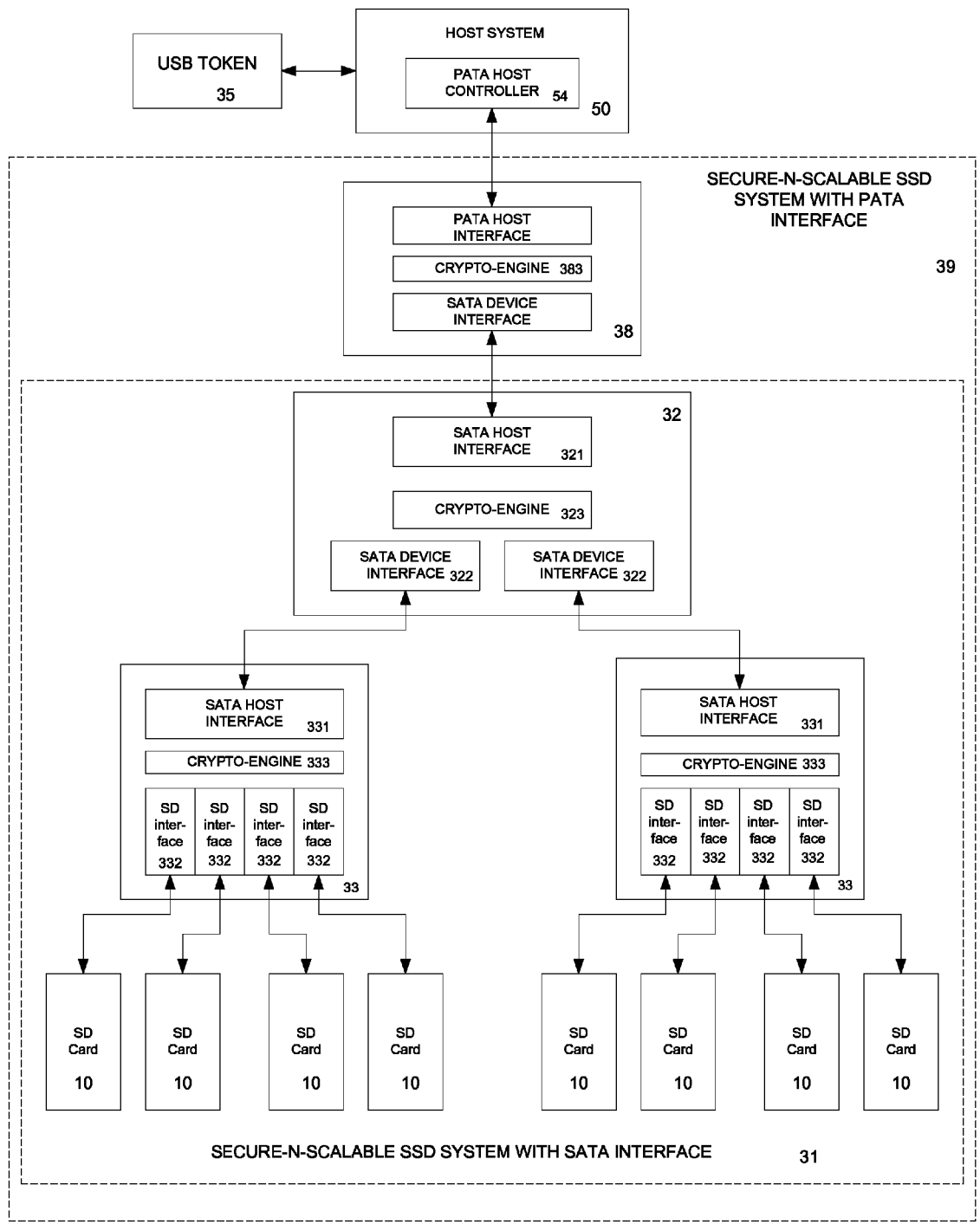
FIG. 5 is a block diagram of a host system and a USB token interfacing with a PATA based secure-and-scalable solid state disk (SNS-SSD) system based on a four-level architecture.

Another embodiment of the block diagram of the invention, secure-and-scalable solid state disk (SNS-SSD) system 39 with PATA interface, is shown in FIG. 5. The host system 50, comprises a processor (not shown), memory (not shown), IO (not shown), a USB interface (not shown), and a PATA host controller 54. It connects to a USB token 35 through a USB interface and works with the secure-and-scalable solid state disk (SNS-SSD) system 39 with PATA interface through a PATA host interface 381.

The secure-and-scalable solid state disk (SNS-SSD) system 39 with PATA interface comprises a first-level secure virtual storage controller 38, a second-level secure virtual storage controllers 32, and two third-level secure virtual storage controllers 33, and eight fourth-level storage device SD cards 10. As described above, the architecture of the invention is expandable and cascadable in density and performance.

As in FIG. 4, the program memory 45 stores the firmware and virtual storage controller information, while the RAM and buffer 46 are used to store data packet and for caching operation.

The DATA write processor 401 interfaces with the virtual storage processor 407 through the crypto-engine that is doing the hardware encryption on-the-fly. The data is transferred from the buffer, encrypted and passed to virtual storage processor 407.

The DATA read processor 402 interfaces with the virtual storage processor 407 through the crypto-engine that is doing the hardware decryption on-the-fly. The data is transferred from virtual storage processor 407, decrypted and passed to the buffer.

The pass-through command processor 403 handles those commands that do not require any local processing. The pass-through command is sent directly downstream without encryption or translation.

The get status and attribute processor 404 returns proper status and/or attributes back to the upstream host system or the upper-level virtual storage controller. If the status or attribute require too much time for the local controller to return, it will normally assert busy status to the requesting upstream host system or the upper-level virtual storage controller. When the proper status or attribute is collected, the interrupt processor 42 and routine 70 are invoked. The interrupt processor 42 generates a soft reset 47 to CPU 44 to warm boot the secure virtual storage controller 40. Consequentially, it interrupts the upstream system for service to interrogate the secure virtual storage controller 40 again, and the correct status or attribute is returned. It is a mechanism to synchronize the host and device when they are running at different pace, and the device needs more time to settle after request.

Figure 6:
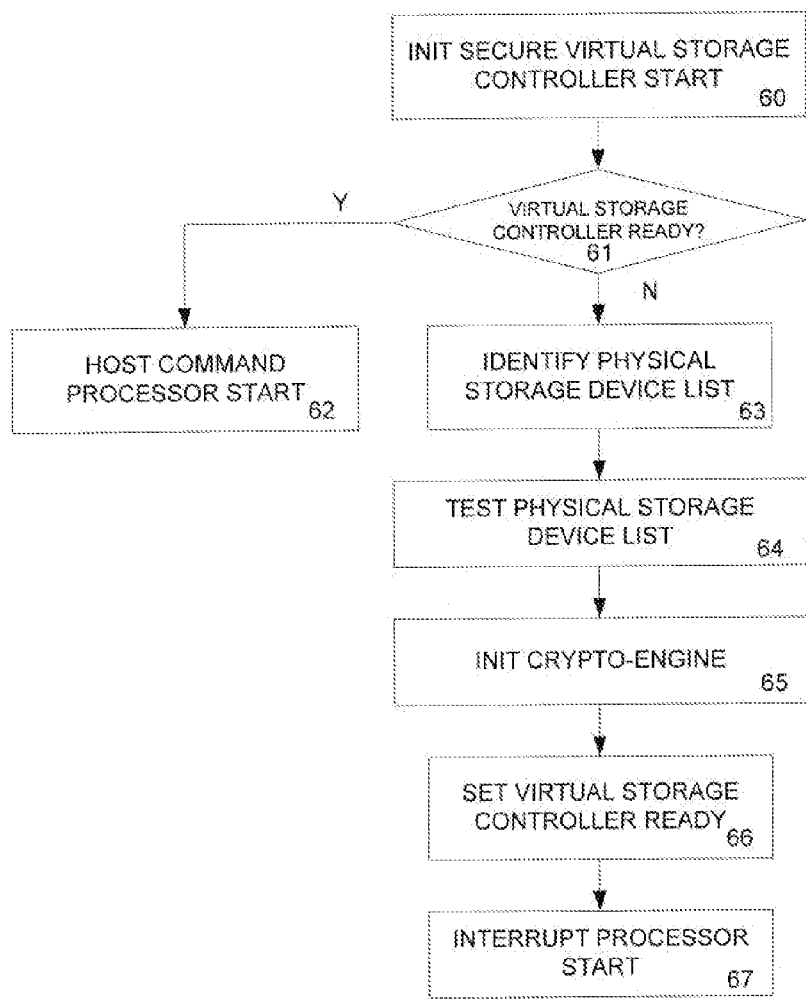
FIG. 6 is the flow chart for the initialization of the secure virtual storage controller.

Every secure virtual storage controller 40 can be identified with a unique ID preprogrammed in the program memory 45. FIG. 6 is the flow chart for the initialization of the secure virtual storage controller. When the secure virtual storage controller 40 is first initialized 60 after power on, it is checked if virtual storage controller is ready, via step 61. If yes, the host command processor starts, via step 62. Otherwise, the controller sends an identify command to the downstream storage device list, via step 63. Once the downstream storage devices 10 are identified, these physical storage devices 10 are tested, via step 64. The crypto-engine is then initialized, via step 65. The virtual storage controller is set ready, via step 66. The interrupt processor is then activated, via step 67.

Figure 7:
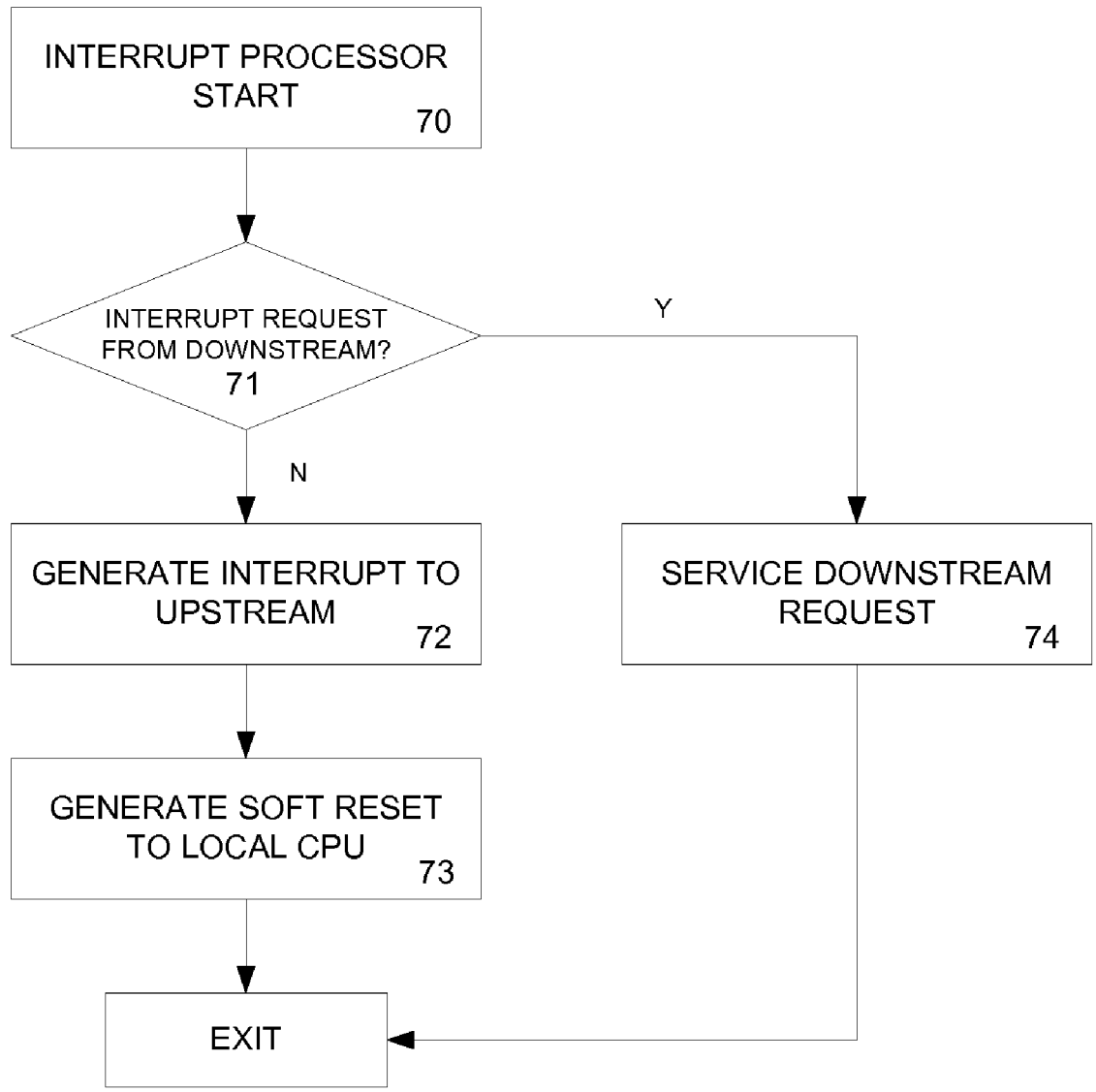
FIG. 7 is the flow chart for the interrupt processor.

FIG. 7 is the flow chart for the interrupt processor. First, it is checked if the interrupt request is from the downstream virtual storage controller, via step 71. If yes, the service is granted, via step 74. Otherwise, an interrupt is generated, via step 72, to the upstream host or an upper-level virtual storage controller for service to configure the secure virtual storage controller 40 again. A soft reset 47 is subsequently generated to the local CPU 44 to warm boot, via step 73, the secure virtual storage controller 40. It is a mechanism to synchronize the host and device when they are running at different pace, and the device needs more time to settle after power-on initialization.

It concludes the initialization of the secure virtual storage controller 40.

Figure 8:
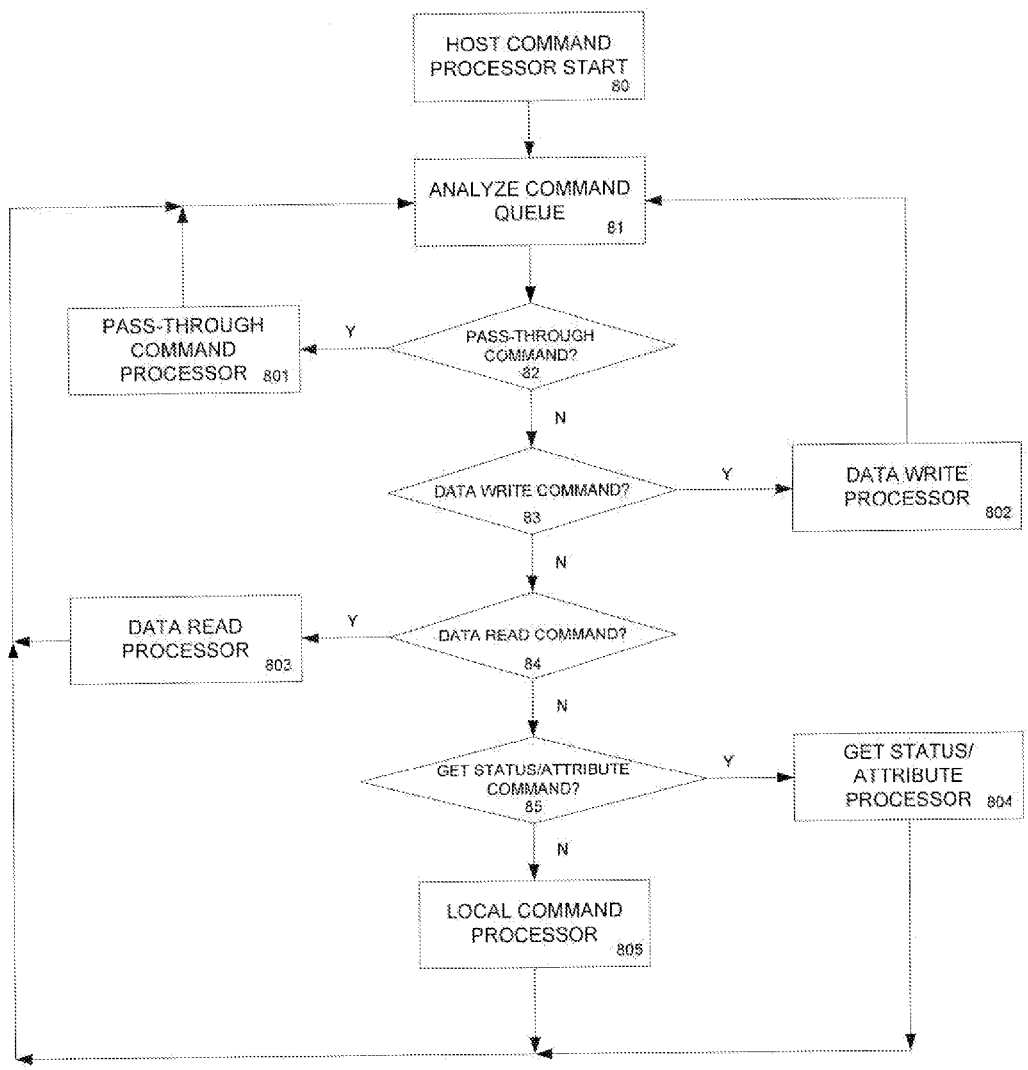
FIG. 8 is the flow chart for the host command processor.

The host command and data processor 43 queues up and buffers packet of command and data between the storage host interface 41 and crypto-engine 406. The extracted command queue is turned over to host command processor routine 80 to process, in FIG. 8. FIG. 8 is the flow chart for the host command processor. The host command and data processor 43 queues up and buffers packet of command and data between the storage host interface 41 and crypto-engine 406. The extracted command queue is turned over to host command processor routine, via step 80, to process. First, the command queue is analyzed, via step 81. Next, it is determined if the command from the command queue is a pass-through command, via step 82. If it is a DATA write command, via step 83, a DATA write processor 401 is called up, via step 802. Otherwise, if it is a DATA read command, via step 84, a DATA read processor 402 is called up, via step 803. Otherwise, if it is a pass-through command, via step 82, a pass-through command processor 403 is called up, via step 801. Otherwise, if it is a get status/attribute command, via step 85, a get status/attribute processor 404 is called up, via step 804. Otherwise, a local command processor 405 is called up, via step 805.

Figure 9:
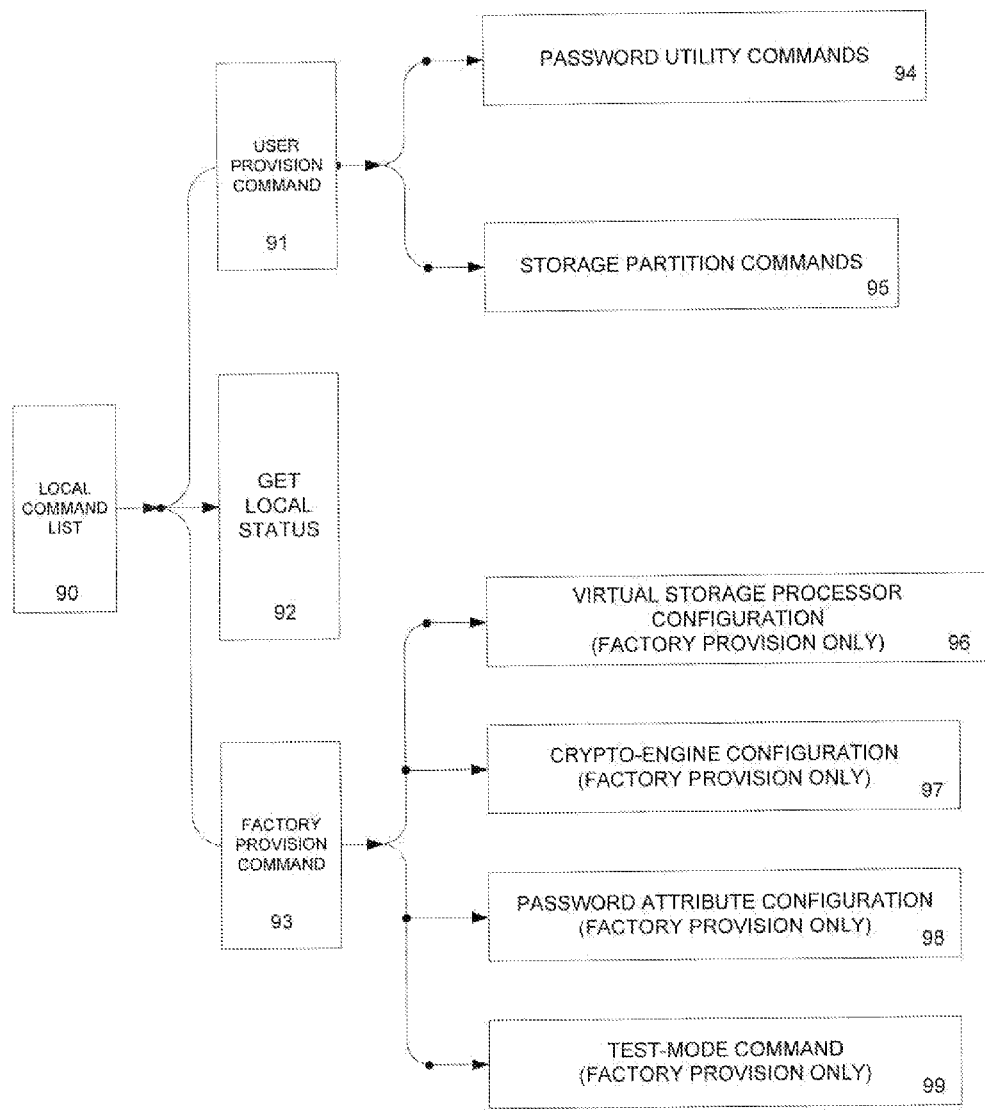
FIG. 9 is the local command list in the local command processor of the secure virtual storage controller.

The local command processor 405 deals with the local functions of crypto-engine 406, virtual storage processor 407 and the local virtual storage controller 40. As shown in FIG. 9, the local command list 90 includes:

A. User provision command 91
  i. Password utility command 94
    1. Set password 941
    2. Change password 942
    3. Authenticate password 943
    4. Set password hint 944
    5. Get password hint 945
    6. Get number of attempts 946
    7. INIT & Partition Request 947
      a. Set Encrypted Key 9471
      b. Get Encrypted New Key 9472
  ii. Storage partition command 95
    8. Get virtual storage attributes 951
    9. Init partition size 952
    10. Format 953
B. Get local status 92
C. Factory provision command 93
  i. Virtual storage processor configuration 96
    11. Get virtual storage controller ID 961
    12. Set virtual storage mode (JBOD, RAID, or others) 962
  ii. Crypto-engine configuration 97
    13. Set Crypto-mode 971
    14. Enable Crypto-engine 972
    15. Get Encrypted Key 973
  iii. Password attribute configuration 98
    16. Set Master password 981
    17. Set Maximum number of attempt 982
    18. Set Managed Mode flag 983
    19. Set Default Password 984
  iv. Test-mode command 99

User provision command 91 is for use by the utility in the field application, including the password authentication utility in USB token 35. It includes password utility commands 94 and storage partition commands 95. Factory provision command 93 is for use in the factory to configure the SSD. It includes virtual storage processor configuration 96, crypto-engine configuration 97, password attribute configuration 98, and test-mode command 99. Get local status command 92 is to return the corresponding status on the virtual storage controller.

Get virtual storage controller ID command 961 is to return the unique ID stored in the program memory 45. Set virtual storage mode command 962 is to set the storage operation mode of JBOD (Just a Bunch of Disks), RAID (Redundant Arrays of Independent Disks) or others, depending on the requirement of performance or power consumption. Set crypto-mode command 971 is to set the encryption mode of the engine. Enable crypto-engine command 972 is to enable the crypto-engine. Set managed mode flag 983 is to allow or disallow provision of SSD in the field. If the flag is set as unmanaged mode, then the USB token is what is needed to do re-provision and initialization of the SSD. If the flag is set as managed mode, then the user has to connect back to the managing server while doing the re-provision and initialization of the SSD. The flag can only be set in the factory. Test-mode command 99 is reserved for testing of SSD by the manufacturer.

Figure 10:
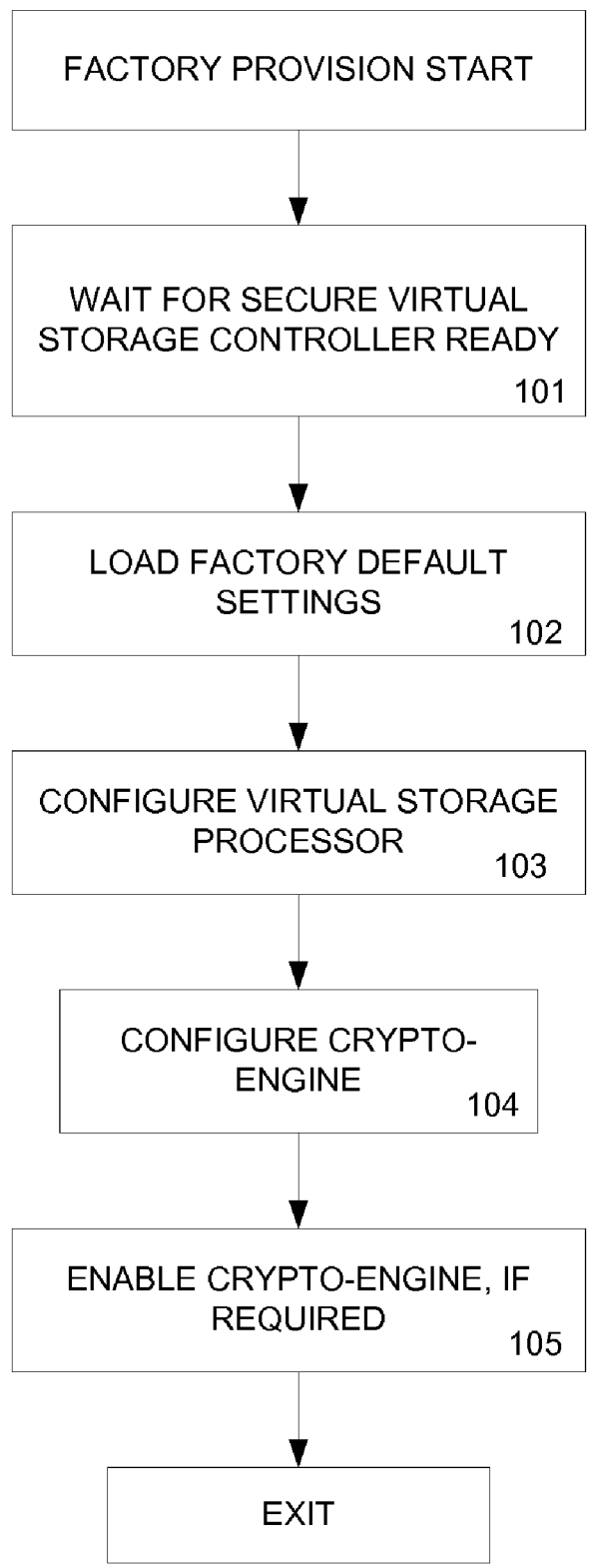
FIG. 10 is the flow chart for factory provision.

Before the SSD is ready for use, it has to go through factory provision during the manufacturing process. The provision is done by connecting the secure-and-scalable solid state disk (SNS-SSD) system 31 to a host system 30 with a proper SATA host controller 34 and possibly with a USB token 35, as shown in FIG. 3. FIG. 10 is the flow chart for factory provision. It first waits for the secure virtual storage controller to be ready, via step 101. Once the controller is ready, the factory default settings are loaded, via step 102. It starts configuring the virtual storage processor, via step 103. Afterwards, it starts configuring the crypto-engine, via step 104. The crypto-engine is enabled, if it is necessary, via step 105.

Figure 11:
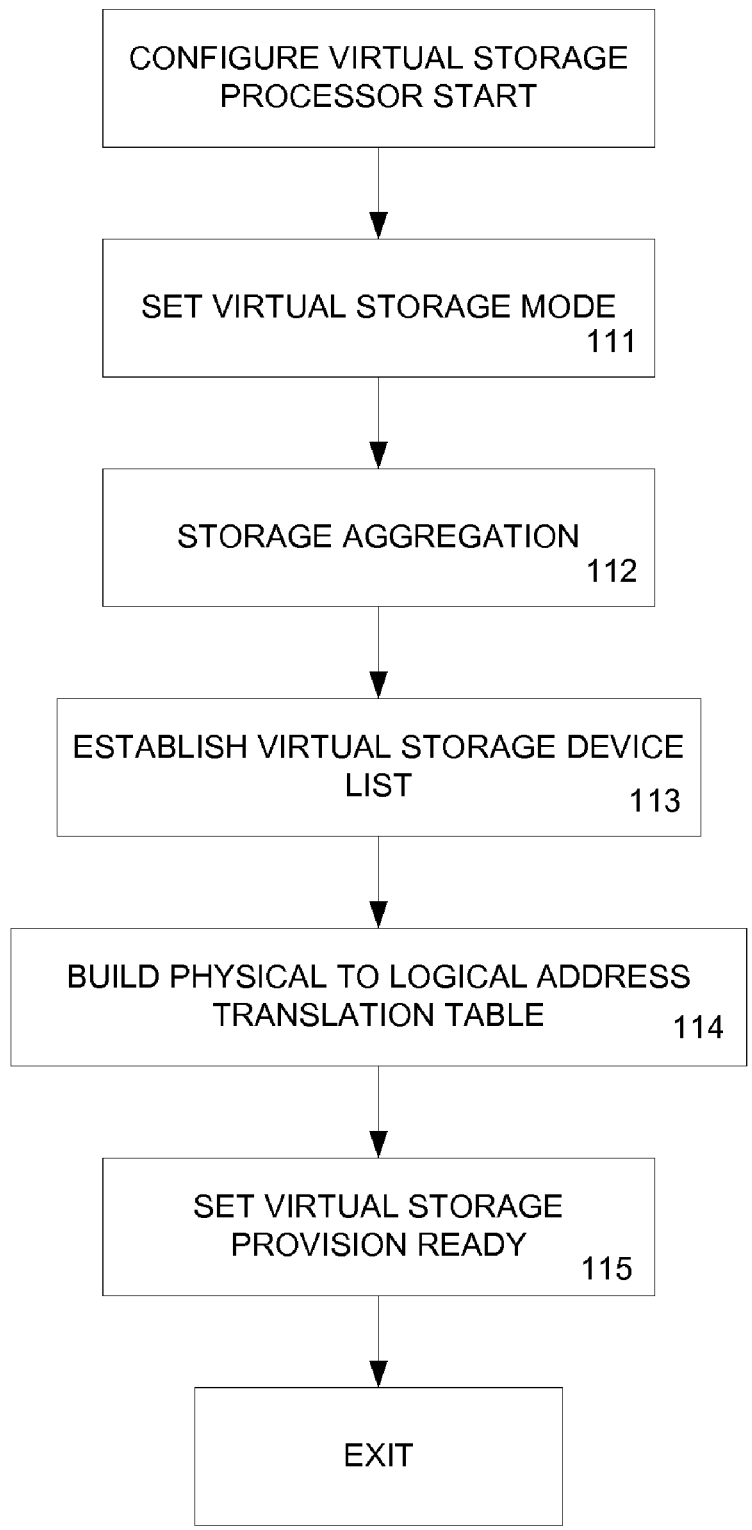
FIG. 11 is the flow chart for virtual storage processor configuration.

FIG. 11 is the flow chart for virtual storage processor configuration. As shown in FIG. 11, the virtual storage mode is set, via step 111, through one of the local commands, set virtual storage mode 962. The virtual storage operation mode is set as JBOD, RAID or others. Accordingly, a virtual storage aggregation is done, via step 112, based on the physical storage device list 64 (See FIG. 6). A virtual storage identification table is established. The virtual storage device list is established, via step 113. A physical to logical address translation table is built up, via step 114, by the virtual storage processor 407 (See FIG. 4.). Afterwards, the virtual storage processor ready status is set, via step 115.

Figure 12:
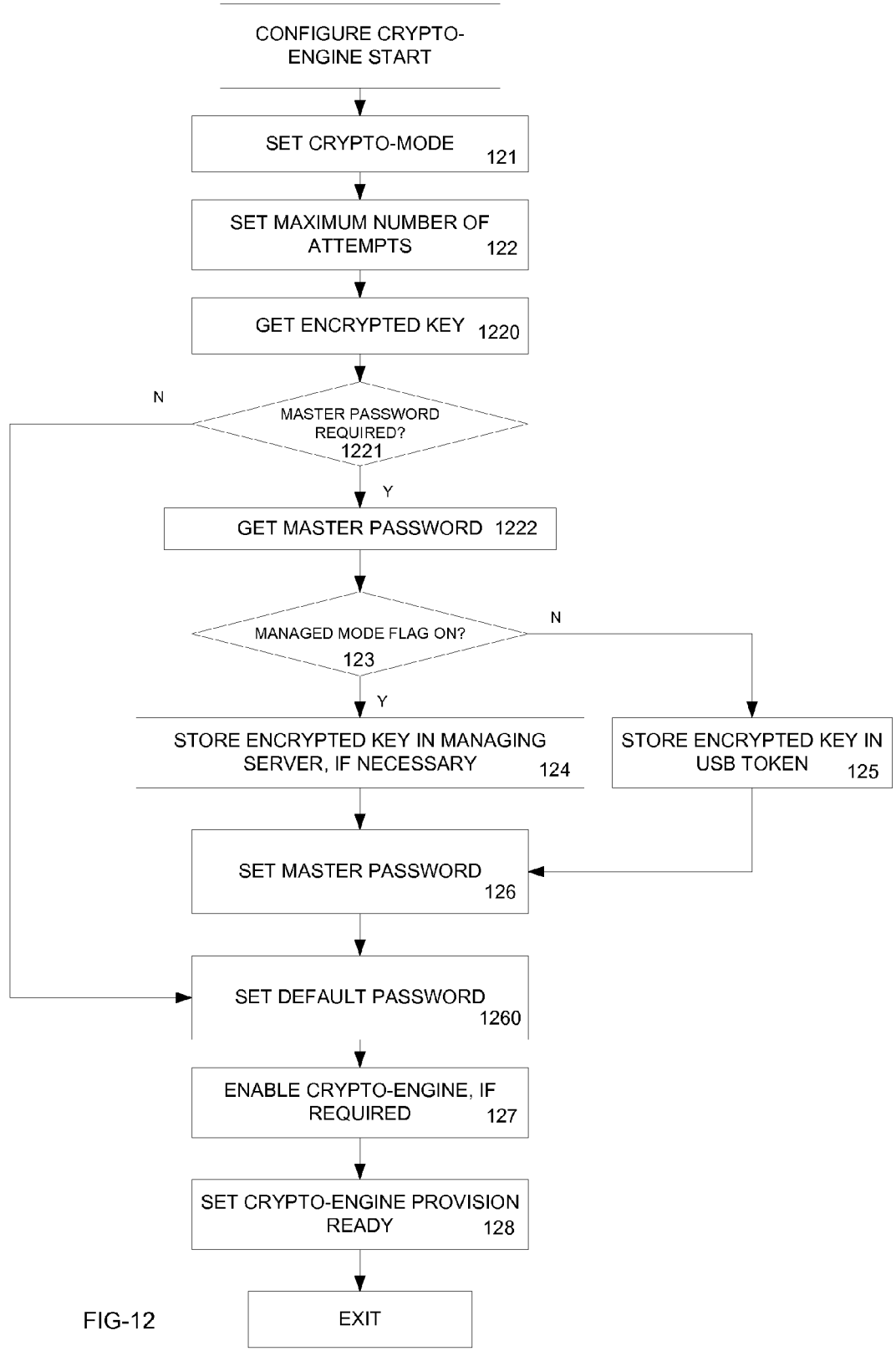
FIG. 12 is the flow chart for crypto-engine configuration.

FIG. 12 is the flow chart for crypto-engine configuration. The crypto-engine is then ready for configuration through one of the local commands, set crypto-mode command 971 is issued, via step 121. Next, the set maximum number of attempts command 982 is issued, via step 122. A get encrypted key command 973 is issued, via step 1220. Correspondingly, a random key is generated (not shown) by the random number generator RNG 134, in the crypto-engine 406. The random key is encrypted and returned to the get encrypted key command 973, via step 1220. If a master password is required, via step 1221, a get master password command process is initiated, via step 1222, and a set master password command 981 is issued. The flag of managed mode of SSD is checked, via step 123. If yes, the encrypted key is stored, via step 124, in the managing server, if necessary. If not, the encrypted key is stored, via step 125, in the USB token 35. The master password is then sent to the crypto-engine through set master password command 981, via step 126. Consequentially, the encrypted master password is then stored in SSD, (not shown). A default password is also set through command 984, via step 1260. Consequentially, the encrypted default password is then stored in SSD, (not shown). The crypto-engine can be disabled or enabled. If it is enabled, it can be set to run at a particular encryption mode based on the requirement, via step 127. Afterwards, the crypto-engine provision flag is set as ready, via step 128.

FIG. 13 is a block diagram for the crypto-engine. The crypto-engine 406 includes a random number generator RNG 134, a hash function HASH 131, a first general encryption engine ENC2 132, a second data encryption engine ENC3 133, a storage upstream interface 135 and a storage downstream interface 136. The detailed implementation of the crypto-engine can be found in the pending U.S. patent application Ser. No. 11/643,101.

Figure 14A:
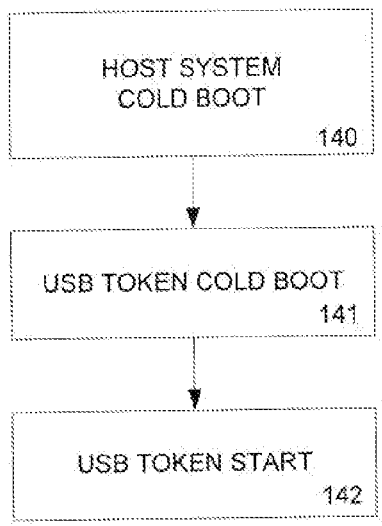
FIGS. 14A-D are flow charts for host system cold-boot, shut-down, hibernation and wake-up from hibernation.

The host system 30 depends on the plugged in USB token 35 to conduct password authentication. Referring to FIG. 14A, after host system 30 cold boots, via step 140. The USB token 35 cold boots, via step 141, as well. The USB token starts operation, via step 142.

Figure 14C:
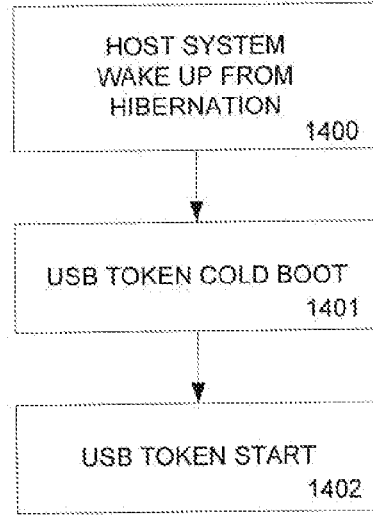
Figure 14B:
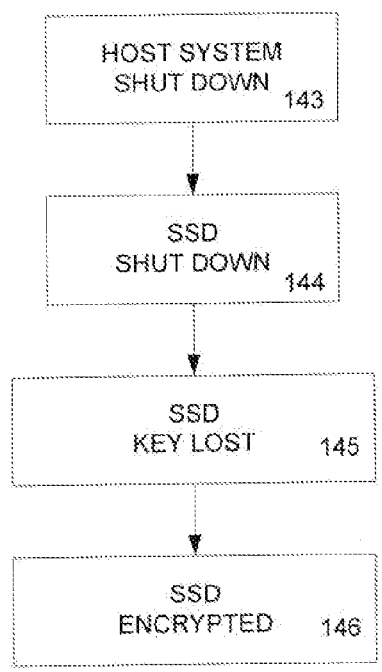

Referring to FIG. 14B, after the host system 30 shuts down, via step 143, the SSD shuts down, via step 144, accordingly. The encryption key in the SSD will be lost, via step 145, due to power outage. The SSD will stay encrypted, via step 146, as long as the encryption key is not restored through password authentication utility loaded in the USB token 35.

Figure 14D:
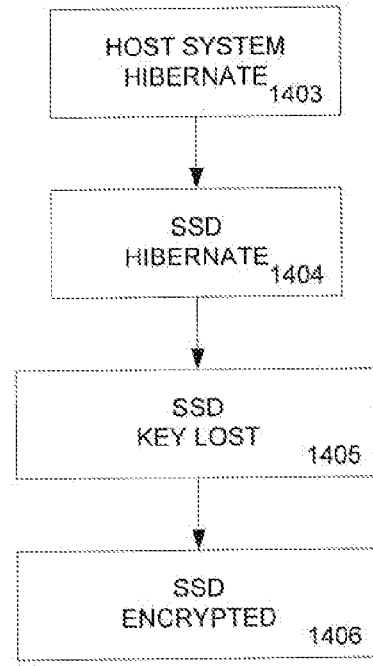

Referring to FIG. 14D, after the host system 30 hibernates, via step 1403, the SSD hibernates, via step 1404, accordingly. The encryption key in the SSD will be lost, via step 1405, due to power outage. The SSD will stay encrypted, via step 1406, as long as the encryption key is not restored through password authentication utility loaded in the USB token 35.

Referring to FIG. 14C, after host system 30 wakes up from hibernation, via step 1400, the USB token 35 cold boots, via step 1401, as well, as in FIG. 14A. The USB token starts operation, via step 1402.

Figure 15:
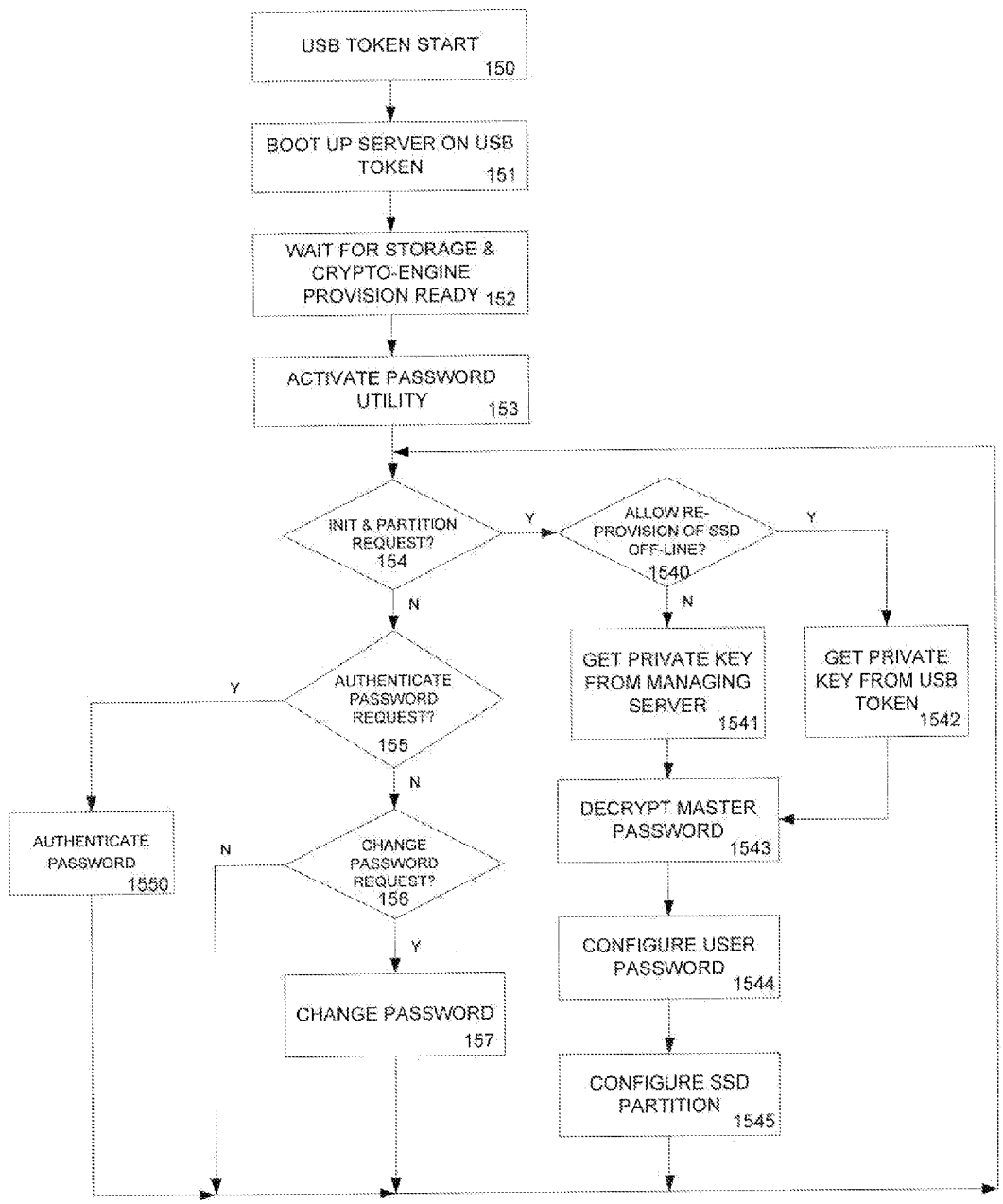
FIG. 15 is the flow chart for USB token boot-up.

FIG. 15 is the flow chart for USB token boot-up. As shown in FIG. 15, once the USB token web server boots up, via step 151, it waits for storage and crypto-engine provision to be ready, via step 152. It then activates the password authentication utility, via step 153. The detailed implementation of the password authentication utility can be found in pending U.S. patent application Ser. No. 11/643,101.

If the init and partition request is generated by the user through command 947, via step 154. Accordingly, the crypto-engine will get a new random key from the random number generator 134 (not shown). It is checked if the managed mode flag is on, via step 1541. If not, the encrypted key is retrieved, via step 1543, from the USB token 35. Otherwise, the encrypted key is retrieved from the managing server, via step 1542. The encrypted key is sent to the crypto-engine through set encrypted key command 9471, via step 1544. The crypto-engine then decrypts and retrieves the key (not shown). The encrypted master password is retrieved and decrypted by the crypto-engine (not shown). A new random key is then generated from the random number generator RNG 134 (not shown). The master password will be encrypted with the new key by the crypto-engine (not shown). The utility will then initiate a get encrypted new key command 9472, via step 1545. The encrypted new key is stored in the managing server or USB token 35, if necessary via step 1546 and 1547. The new user password is then requested from the user and configured, via step 1548. Both master and user password are hashed with the newly generated key through HASH function 131 and stored on the SSD (not shown). The SSD partition is then configured, via step 1549.

If the request is not for init and partition, it is checked if an authenticate password request is generated, via step 155. If so, password authentication starts, via step 1550. Otherwise, it is checked if a change password request is generated, via step 156. If so, change password utility starts, via step 157. Otherwise, it loops back to check for new password utility request, via step 154.

Figure 16:
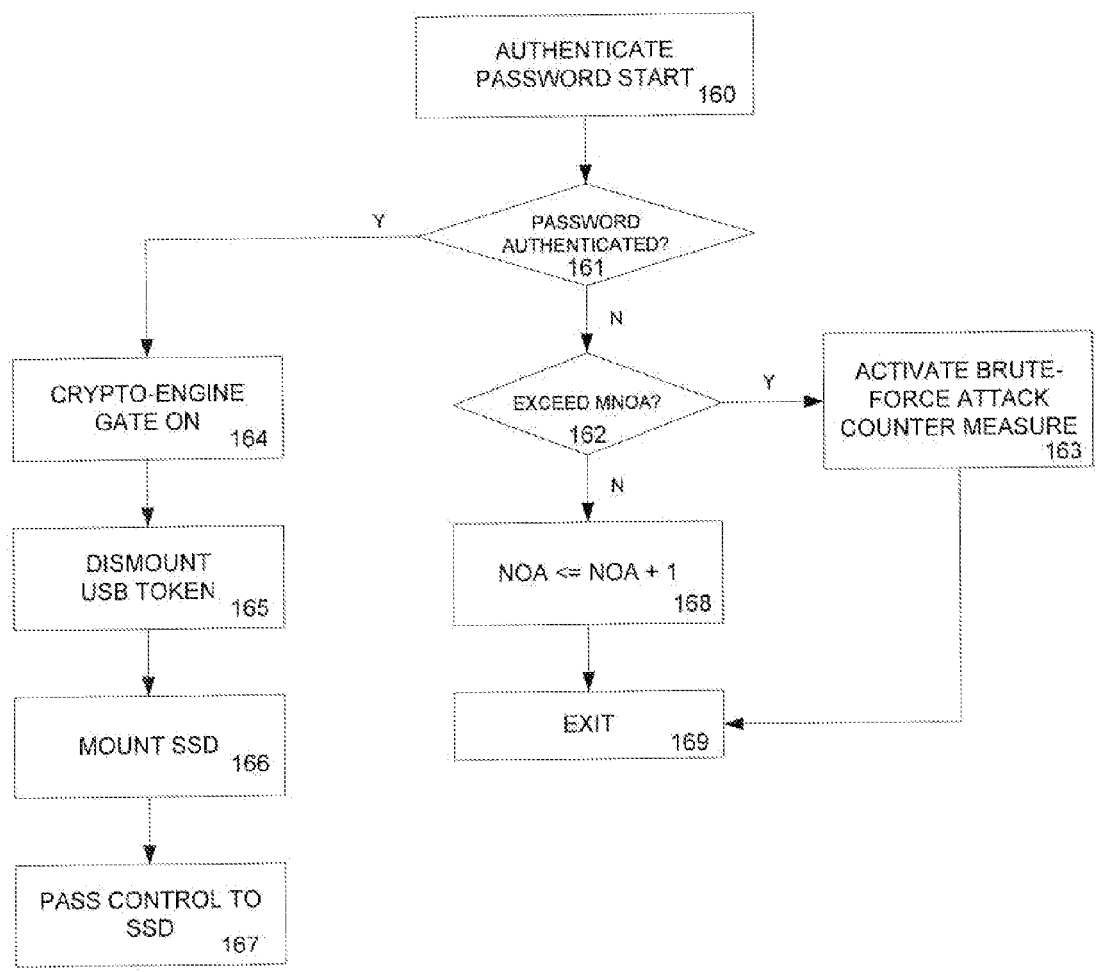
FIG. 16 is the flow chart for password authentication.

FIG. 16 is the flow chart for password authentication. First, it is checked if the password is authenticated, via step 161. If so, the crypto-engine key is retrieved and loaded into the crypto-engine and the gate is turned on, via step 164. Afterwards, the USB token is dismounted, via step 165. The SSD is then mounted, via step 166. The control is then passed on to SSD, via step 167. If the password is not authenticated, it is checked if the maximum number of attempts (MNOA) is exceeded, via step 162. If so, the counter measure against brute-force attack is activated, via step 163. Otherwise, the number of attempts (NOA) count is incremented, via step 168. It then exits, via step 169, back to the password utility loop 154 of FIG. 15.

Although the secure and scalable solid state disk system in accordance with the present invention will function with any of a secure digital (SD) card, multimedia card (MMC), compact flash (CF) card, universal serial bus (USB) device, memory stick (MS), ExpressCard, LBA-NAND, ONFI, eMMC, and eSD; one of ordinary skill in the art readily recognizes that the disk system would function with other similar memory devices and still be within the spirit and scope of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method re-synchronizing a secure and scalable solid state disk system (SSDS) with a host, the method comprising:
    asserting a busy status to the requesting upstream host system or the upper-level virtual storage controller;
    sending an Identify command to a downstream storage device list;
    testing the identified downstream storage devices;
    initializing a crypto engine; and
    starting an interrupt processor to synchronize the SSDS to the host.

2. The method of claim 1 wherein starting the interrupt processor comprises:
    generating an interrupt to the host, and
    generating a soft reset to the local CPU.

3. The method of claim 1 wherein starting a host command processor if the solid state disk system is re-synchronized and initialized.

4. The method of claim 3 wherein the host command start comprises:
- analyzing the command queue;
- determining if the command is a one of a data read command, a data write command, a get status and attribute command, a pass-through command; and a local command;
- sending the command to a data read processor if the command is a data read command;
- sending the command to a data write processor if the command is a data write command;
- sending the command to a pass-through processor if the command is a pass-through command; and
- sending the command to a get status and attribute processor is the command is a get status and attribute command, otherwise sending to a local command processor.

5. A computer readable medium containing program instructions for re-synchronizing a secure and scalable solid state disk system (SSDS) with a host, the program instructions for:
- asserting a busy status to the requesting upstream host system or the upper-level virtual storage controller;
- sending an Identify command to a downstream storage device list;
- testing the identified downstream storage devices;
- initializing a crypto engine; and
- starting an interrupt processor to synchronize the SSDS to the host.

6. The computer readable medium containing program instructions of claim 5 wherein starting the interrupt processor comprises:
- generating an interrupt to the host; and
- generating a soft reset to the local CPU.

7. The computer readable medium containing program instructions of claim 5 wherein starting a host command processor if the solid state disk system is re-synchronized and initialized.

8. The computer readable medium containing program instructions of claim 6 wherein the host command start comprises:
- analyzing the command queue;
- determining if the command is a one of a data read command, a data write command, a get status and attribute command, a pass-through command; and a local command;
- sending the command to a data read processor if the command is a data read command;
- sending the command to a date write processor if the command is a date write command;
- sending the command to a pass-through command processor if the command is a pass-through command; and
- sending the command to a get status and attribute processor if the command is a get status and attribute command, otherwise sending to a local command processor.

* * * * *